J. Palmer.
Elliptic Spring.
N°. 78,230. Patented May 26, 1868.

Witnesses:
Rose S. Turner
Chas. F. Brown

Inventor:
Joseph Palmer
by Geo. E. Brown
Atty

United States Patent Office.

JOSEPH PALMER, OF CONCORD, NEW HAMPSHIRE.

*Letters Patent No. 78,230, dated May 26, 1868.*

---

IMPROVEMENT IN WELDING THE EARS OF ELLIPTIC SPRINGS.

---

*The Schedule referred to in these Letters Patent and making part of the same.*

---

TO ALL WHOM IT MAY CONCERN:

Be it known that I, JOSEPH PALMER, of Concord, in the county of Merrimack, and State of New Hampshire, have invented a new and improved Machine for Welding Ears for French Heads for Elliptic Springs; and I do hereby declare that the following is a full and exact description thereof, reference being had to the accompanying drawings, making part of this specification, of which drawings—

On the 3d day of September, 1867, Letters Patent of the United States, numbered 68,454, were granted and issued to me, upon an improved die for making heads of elliptic springs, by the use of which die ears are punched of the required form, to be fixed on the ends of elliptic springs preparatory to welding.

The invention upon which I now seek to obtain Letters Patent is a machine for welding ears upon the ends of such main leaf, for the purpose of making French heads to the same; and for the purpose of enabling others skilled in the art to make and use my invention, I will proceed to describe its construction and mode of operation.

The drop-hammer, marked A in the figures, is operated by means of the pulley B, caused to revolve by belting, and said hammer works vertically in a groove in the upright standard, as shown in the figure; but this portion of the machine I do not claim as my invention.

Figure 4:
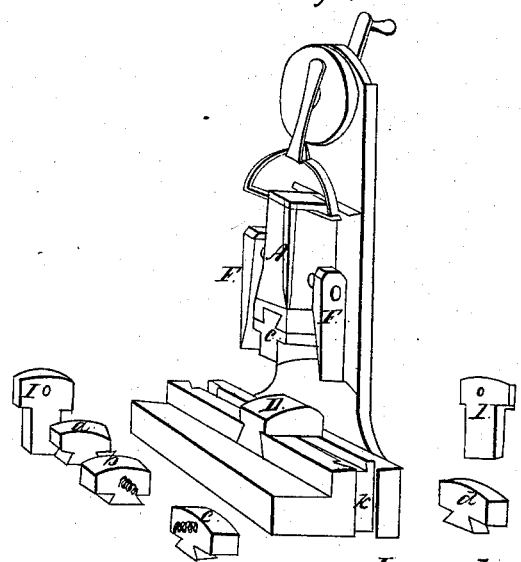
Figure 4 is a perspective view of my machine, and the separate parts thereof, showing the upper and lower dies partially withdrawn, and the slides and end-pieces employed in the construction of my machine.

I cut a dove-tail groove in the lower end of the drop A, from front to rear, in which the die C is fitted. The construction of this die C, and the manner in which I fit the same, is shown in fig. 4, where the die is shown partially withdrawn, for the purpose of better illustration. The lower face of said die C is shaped to correspond with the upper or convex surface of my spring-head.

I also construct the bottom die D as shown in the figures, and the upper surface of the same is shaped to correspond with the under or concave surface of my spring-head, and the sides of this die are cut away to receive the ears, and this die is fitted in a dove-tail groove in the bottom part of my frame, as shown in fig. 4, when the slide is seen partially withdrawn, for the purpose of better illustration.

Figure 1:
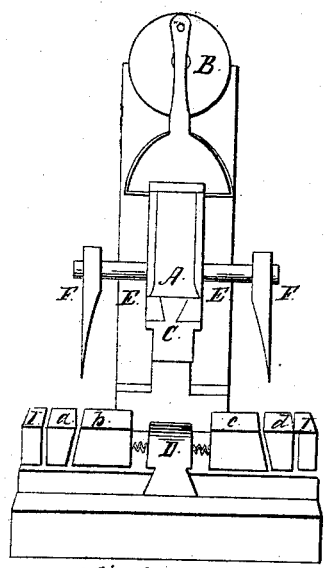
Figure 1 is a front elevation of my machine, showing the position of the parts when the drop-hammer is at its highest elevation.

Through the drop, A, I pass the horizontal arms E E, fig. 1, and to these horizontal arms I attach the vertical wedges F F, fig. 1, which wedges, it will be seen, must move with the drop A. These wedges may be adjusted at any distance from each other required by the work to be done, and are held in place by keys or set-screws.

Figure 3:
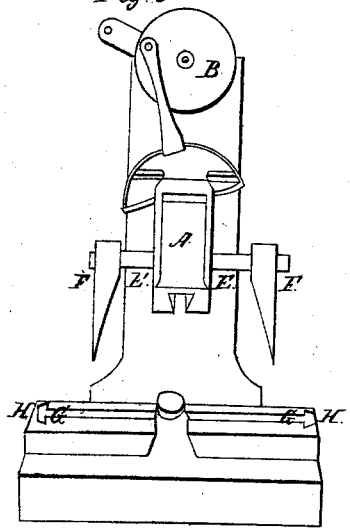
Figure 3 is a view of the framework of my machine, with the slides and dies removed, to show the grooves in which said slides and dies operate.

From right to left, through the bottom of my framework, I cut the dove-tail groove, as shown in fig. 3, from G to G, which groove is intersected at right angles by the dove-tail groove shown at H, fig. 3.

Figure 2:
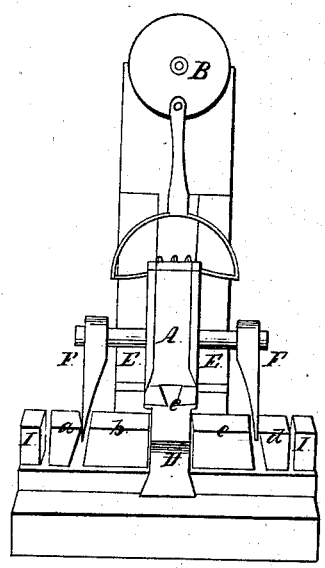
Figure 2 is a front elevation of my machine, showing the position of the parts when the drop-hammer is at its lowest depression.

In this groove, G G, I fit the slides $a\,b\,c\,d$, figs. 1, 2, and 4. Said slides and the construction thereof are shown in perspective at $a\,b\,c\,d$, fig. 4.

I construct the end-pieces I I, figs. 1, 3, and 4, which fit respectively in the vertical dove-tail grooves in the ends of the bottom frame, one of which is shown at K, fig. 4.

And in said end-pieces I adjust the set-screws, shown in the figures; and in the slides $b\,c$, fig. 4, I place the spiral springs, shown in the figures; and the use of said set-screws and spiral springs I will hereafter more fully explain.

I use with my machine various sets of dies, C and D, of various sizes, according to the work to be done, but the dove-tails of all said dies are alike, to fit the grooves referred to, so that they may be easily adjusted or withdrawn at pleasure; and figs. 1 and 2 show my machine with all the parts in place and ready for work.

To illustrate the operation of my machine, I will suppose I have to weld the ears upon the main leaf of an elliptic spring—say, an inch and a quarter spring.

The ears being struck by the right and left dies, described in my Letters Patent of September 3, 1867, I place said ears upon the ends of the main leaf; and by a blow of the hammer upon the lips upon said ears, they are held sufficiently tight to prevent their dropping off in the furnace. The ears, and end of the leaf to which they are to be welded, are then placed in the furnace, and heated to the proper point for welding.

I insert in the drop A the upper die C, of the proper size, and in the groove H, in the bed-plate, I place the lower die D, corresponding with said upper die.

By means of the set-screws in the end-pieces I I, I adjust the slides so as to give the necessary space between the die C and the slides $b$ and $c$, or either thereof, respectively, and the spiral springs act to hold the slides $b$ and $c$ apart from the die C when the hammer rises.

I adjust the wedges upon the horizontal arms so that the points thereof will be directly over the lips between the slides $a$ and $b$ and $c$ and $d$, respectively, as shown in fig. 1.

When ready for welding, I place my spring-head, concave surface down, upon the bottom die D, the ears fitting into the spaces on either side of said die, as before explained, prepared for their reception.

I then set the machine in motion by means of a tightening-pulley. The drop descends, and the wedges F F are drawn between the slides $a$ and $b$ and $c$ and $d$, thus giving a vertical blow from the drop, and a lateral blow from each side, at the same moment of time.

The wedges F F are made of steel, and all the other parts of my machine may be made of cast iron.

The spring-head being subjected to the action of my machine for a few seconds, the machine is stopped and the spring withdrawn, and the welding will be completed and the spring-head formed with greater accuracy and in a better and more substantial manner than the same work can be done by hand, and at a saving of nine-tenths of the time.

What I claim as my invention, and desire to secure by Letters Patent, is—

The combination of the wedges F F, the drop A, the upper and lower dies C D, the slides $a\ b\ c\ d$, and end-pieces I I, all constructed and arranged as shown, and by means of which vertical and lateral blows are given at the same time, for the purpose set forth.

JOSEPH PALMER.

Witnesses:
H. W. STEVENS,
ARTHUR FLETCHER.